United States Patent
Chen et al.

[19]

[11] Patent Number: 6,061,261
[45] Date of Patent: May 9, 2000

[54] WALL OUTLET WITH DIRECT CURRENT OUTPUT

[75] Inventors: Dao-Long Chen; Daniel L. Ellsworth, both of Fort Collins, Colo.

[73] Assignees: Hyundai Electronics America, Inc., San Jose, Calif.; NCR Corporation, Dayton, Ohio

[21] Appl. No.: 08/712,826

[22] Filed: Sep. 12, 1996

Related U.S. Application Data

[63] Continuation of application No. 08/337,591, Nov. 10, 1994, Pat. No. 5,563,782.

[51] Int. Cl.[7] .................................................... H02M 1/00
[52] U.S. Cl. ............................................ 363/146; 363/147
[58] Field of Search ................................... 363/146, 147, 363/178

[56] References Cited

U.S. PATENT DOCUMENTS

| | | | |
|---|---|---|---|
| 3,034,000 | 5/1962 | Todd | 307/156 |
| 3,500,056 | 3/1970 | Riley | 307/13 |
| 3,509,356 | 4/1970 | Peebles | 307/42 |
| 4,386,333 | 5/1983 | Dillan | 336/107 |
| 4,625,259 | 11/1986 | Krechmer et al. | 361/340 |
| 4,821,165 | 4/1989 | Gunn | 363/60 |
| 4,866,585 | 9/1989 | Das | 363/8 |
| 4,901,219 | 2/1990 | Erickson et al. | 363/146 |
| 4,915,639 | 4/1990 | Cohn et al. | 439/188 |
| 4,943,902 | 7/1990 | Severinsky | 363/80 |
| 4,985,806 | 1/1991 | Mazzullo et al. | 361/392 |
| 5,097,404 | 3/1992 | Layh | 363/146 |
| 5,119,285 | 6/1992 | Liu | 363/127 |
| 5,135,407 | 8/1992 | Berends | 439/236 |
| 5,159,545 | 10/1992 | Lee | 363/146 |
| 5,245,220 | 9/1993 | Lee | 307/80 |
| 5,281,154 | 1/1994 | Comerci et al. | 439/107 |
| 5,301,095 | 4/1994 | Teramoto et al. | 363/21 |
| 5,355,301 | 10/1994 | Saito et al. | 363/147 |
| 5,406,191 | 4/1995 | Salo | 323/320 |
| 5,563,782 | 10/1996 | Chen et al. | 363/146 |

FOREIGN PATENT DOCUMENTS

| | | | |
|---|---|---|---|
| 0409226 | 1/1991 | European Pat. Off. | H02J 3/00 |
| 3110005 | 9/1992 | Germany | H01R 13/70 |
| 7015835 | 1/1995 | Japan | H02G 3/02 |
| 9533288 | 12/1995 | WIPO | H01R 13/66 |

*Primary Examiner*—Stuart N. Hecker
*Attorney, Agent, or Firm*—Townsend and Townsend and Crew LLP

[57] ABSTRACT

An AC-DC voltage conversion integrate circuit that integrates all the control and protection circuits, as well as the power transistors, into a single module. Passive components, such as the transformer and capacitors, are very small, as the switching frequency is in the KHz or MHz range. Including one or more integrated switched mode power supply ICs in every wall outlet allows for providing a plurality of DC voltages from such outlets.

16 Claims, 14 Drawing Sheets

AC PLUG       DC 3V PLUG       DC 6V PLUG 6,061,261

WALL OUTLET WITH DIRECT CURRENT OUTPUT

This is a continuation of application Ser. No. 08/337,591 filed Nov. 10, 1994, now U.S. Pat. No. 5,563,782.

TECHNICAL FIELD

The present invention relates to power supplies, and more particularly to an integrated AC-DC voltage converter.

BACKGROUND OF THE INVENTION

In many electronic appliances and devices (e.g. electronic clocks, radios, CD players, computers, video games, etc.), the bulkiest part of the system is the power supply which, traditionally, requires a heavy isolation transformer and, sometimes, a heat sink and a cooling fan. The power supply is needed to convert the AC voltage from the wall outlet to a DC voltage that can be used by the system. For some systems that do not have a built-in power supply (e.g. portable computers), an external AC-to-DC adapter is needed to operate the systems from a wall outlet.

Figure 1:
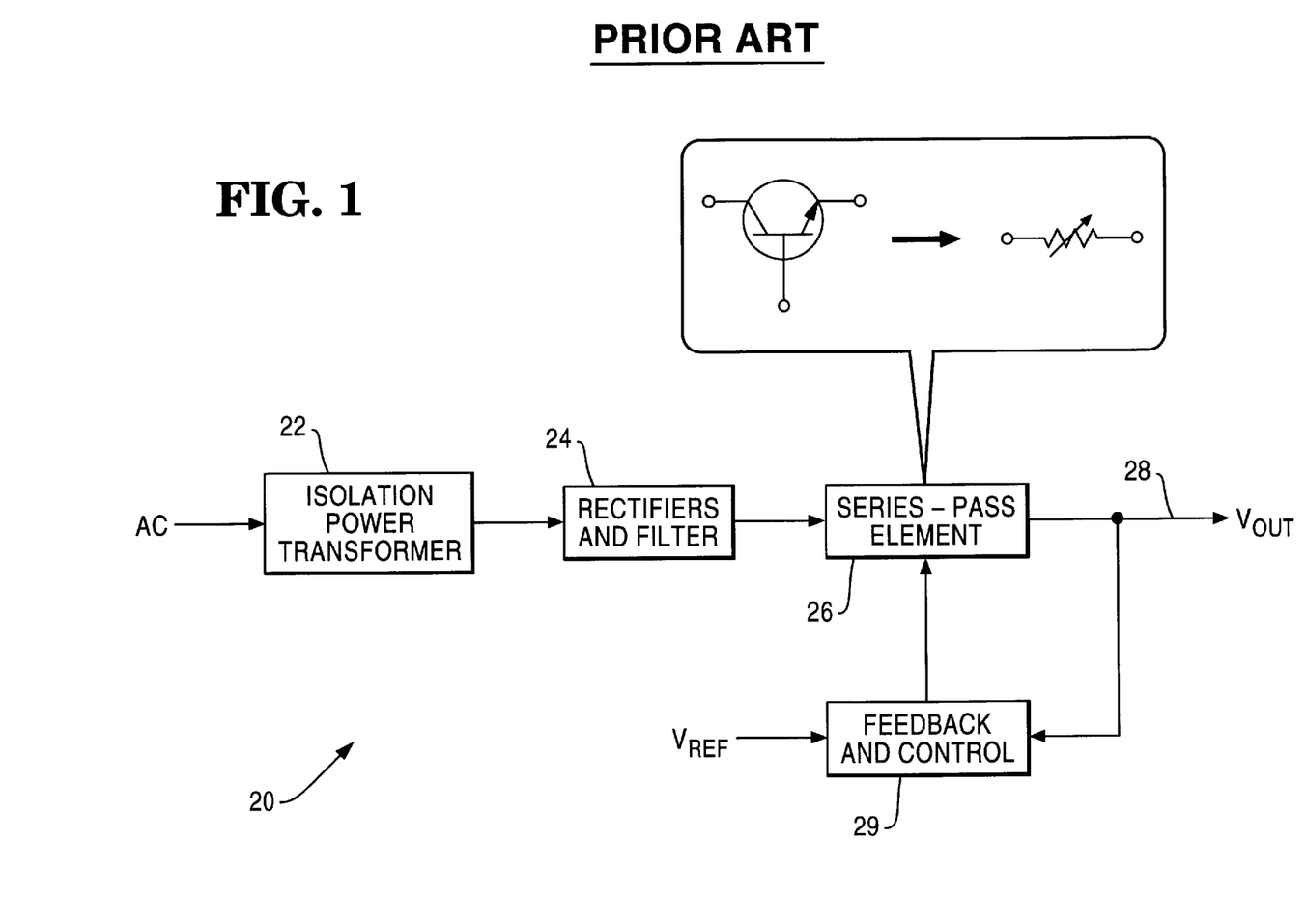
FIG. 1 is a block diagram of a linear power supply.

The reason for providing AC voltages to typical power outlets, such as a wall outlet, is that the only cost-effective way to convert an AC voltage to a DC voltage was to use a linear power supply. FIG. 1 shows the basic block diagram of a linear power supply 20. The isolation transformer 22 serves two purposes: 1) isolate the output from the input in order to meet federal safety regulations and 2) reduce the input voltage from a higher voltage (e.g. 110V) to a lower voltage (e.g. 5V). The reduced AC voltage is then rectified and filtered at 24 into a DC voltage. The series-pass element 26 regulates the output DC voltage by monitoring the loading at the output 28 by feedback and control 29. The drawback of the linear power supply is that, due to the low AC input frequency (60 Hz), both the isolation transformer and the filter capacitors have to be relatively large. Furthermore, the power conversion efficiency of a linear power supply is only about 40 to 50%. It is also impractical to attempt to fit a linear power supply into the size of an AC wall outlet. Thus, due to the large size requirements, conversion from AC-to-DC voltages is typically done inside or within the device that requires a DC supply voltage.

Figure 2:
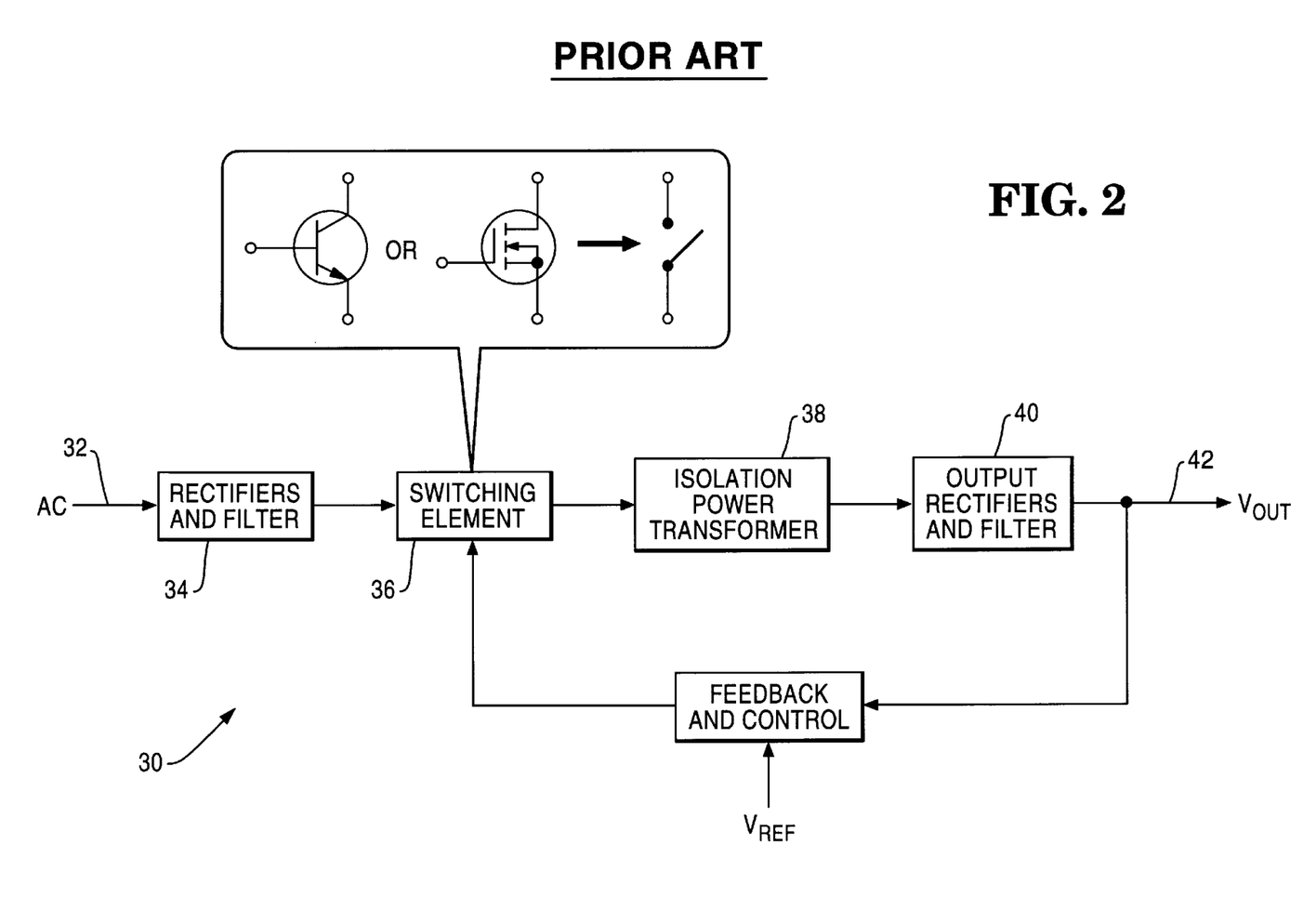
FIG. 2 is a block diagram of a switch mode power supply.

The progress of the power semiconductor technology in recent years has made a new type of power supply economically feasible. FIG. 2 shows a block diagram of a so-called "switch mode power supply" (SMPS) or "class D" power supply 30. In an SMPS, the AC input 32 is rectified and filtered at 34 into a DC voltage without going through an isolation transformer. A switching element 36 (usually a power transistor or transistors) will chop the DC voltage into a very high frequency AC voltage (up to several hundred KHz). This high frequency AC voltage is then fed to an isolation transformer 38 before being rectified and filtered again at 40 to provide the output 42 of the power supply. Since the transformer and the output filter only have to deal with a very high frequency AC voltage, the size of the transformer and the filter capacitors can be relatively small. In addition, since the switch element usually dissipates very little power, the efficiency of an SMPS is usually about 70 to 80%.

However, the advent of SMPS has only resulted in reducing the size, weight, and cost of power supplies inside or within the device that requires a DC supply voltage.

It is an object of the present invention to provide an improved power supply distribution technique and system.

It is a further object of the present invention to provide an improved AC-to-DC power supply conversion.

It is yet another object of the present invention to provide an improved method for powering devices which require DC supply voltages.

It is yet a further object of the present invention to provide DC voltages within an electrical outlet.

It is still another object of the present invention to provide an integrated circuit device for converting AC-to-DC voltages.

It is another object of the present invention to convert AC-to-DC voltages by a device attached to the normally inaccessible side of a wall outlet.

SUMMARY OF THE INVENTION

An AC-DC voltage conversion integrated circuit (IC) of the present design integrates all the control and protection circuits, as well as the power transistors, into a single module. Passive components, such as the transformer and capacitors, are very small, as the switching frequency is in the KHz or MHz range. Including one or more integrated SMPS ICs in every wall outlet allows for providing a plurality of DC voltages from such outlets.

DETAILED DESCRIPTION OF THE PREFERRED EMBODIMENT

Figure 3:
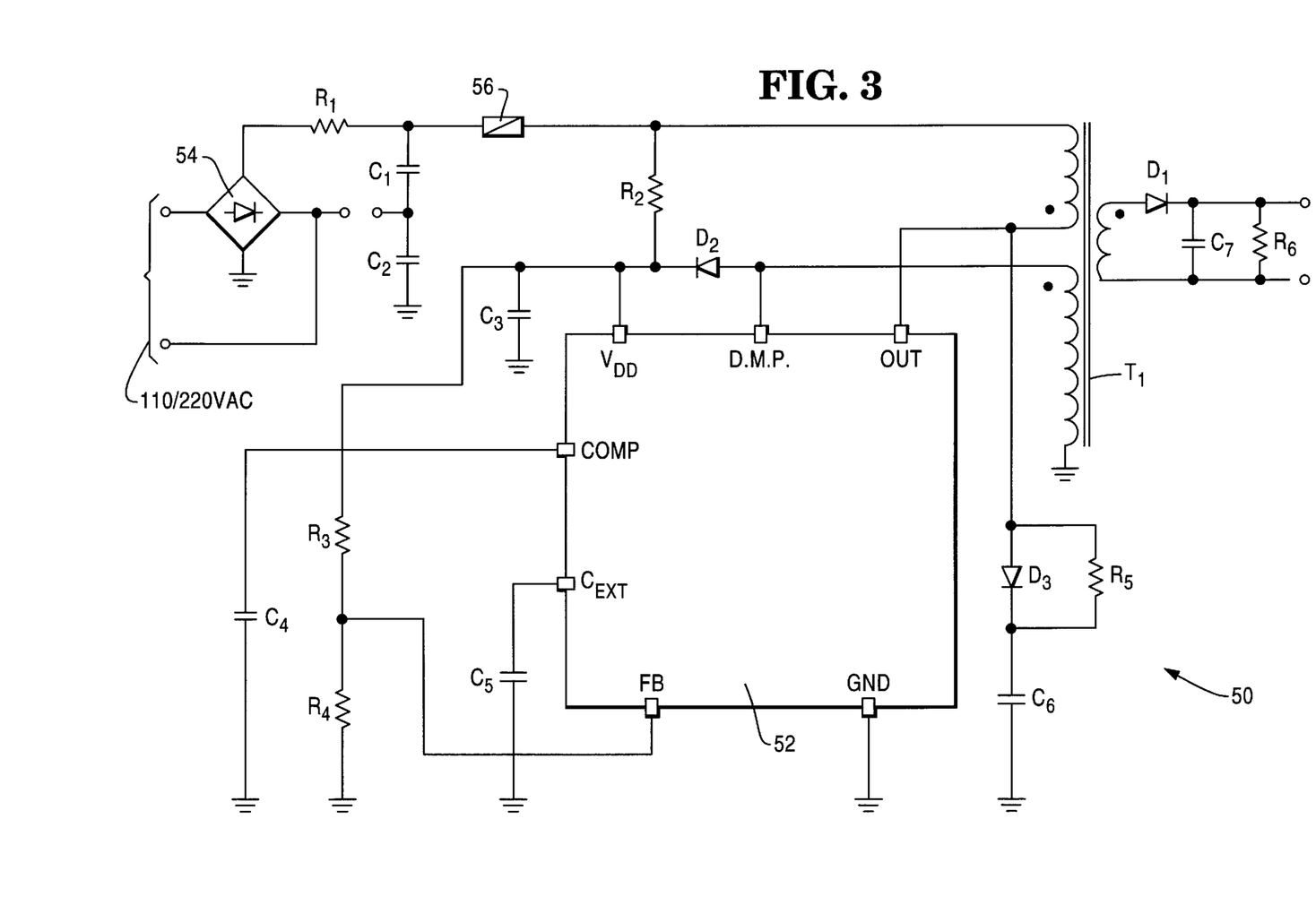
FIG. 3 is a schematic for a switch mode power supply.

FIG. 3 shows an SMPS that can be made with a very small form factor. The SMPS 50 comprises an SMPS integrated circuit device 52 (hereinafter SMPS IC) and a few passive components. The following design components provide a 10 KHz operation at 40 Watts. Element 54 is a full wave bridge rectifier, and preferably a Fagor silicon bridge rectifier, part number FBP04, which is available from Newark Electronics (4755 Paris Street, Denver Colo. 80239). Element 56 is a negative temperature coefficient thermistor, preferably a Keystone NTC thermistor, stock number 81F3390, also available from Newark Electronics. Transformer T1 is preferably a Magnetek Triad PC-Mount Flat Pack power transformer, stock number 46F1942 (for 5 volts DC output), also available from Newark Electronics. The remaining component values for FIG. 3 are shown below in Table 1.

TABLE 1

| DEVICE | VALUE |
|---|---|
| R1 | 5 ohms |
| R2 | 100 K ohms |
| R3 | 40 K ohms |
| R4 | 60 K ohms |
| R5 | 10 K ohms |
| R6 | 1 M ohms |
| C1 | 60 uF |
| C2 | 60 uF |
| C3 | 10 uF |
| C4 | 10 uF |
| C5 | 1 uF |
| C6 | 100 uF |
| C7 | 100 uF |
| D1 | 400 V, 10A |
| D2 | 400 V, 10A |
| D3 | 400 V, 10A |

Figure 4:
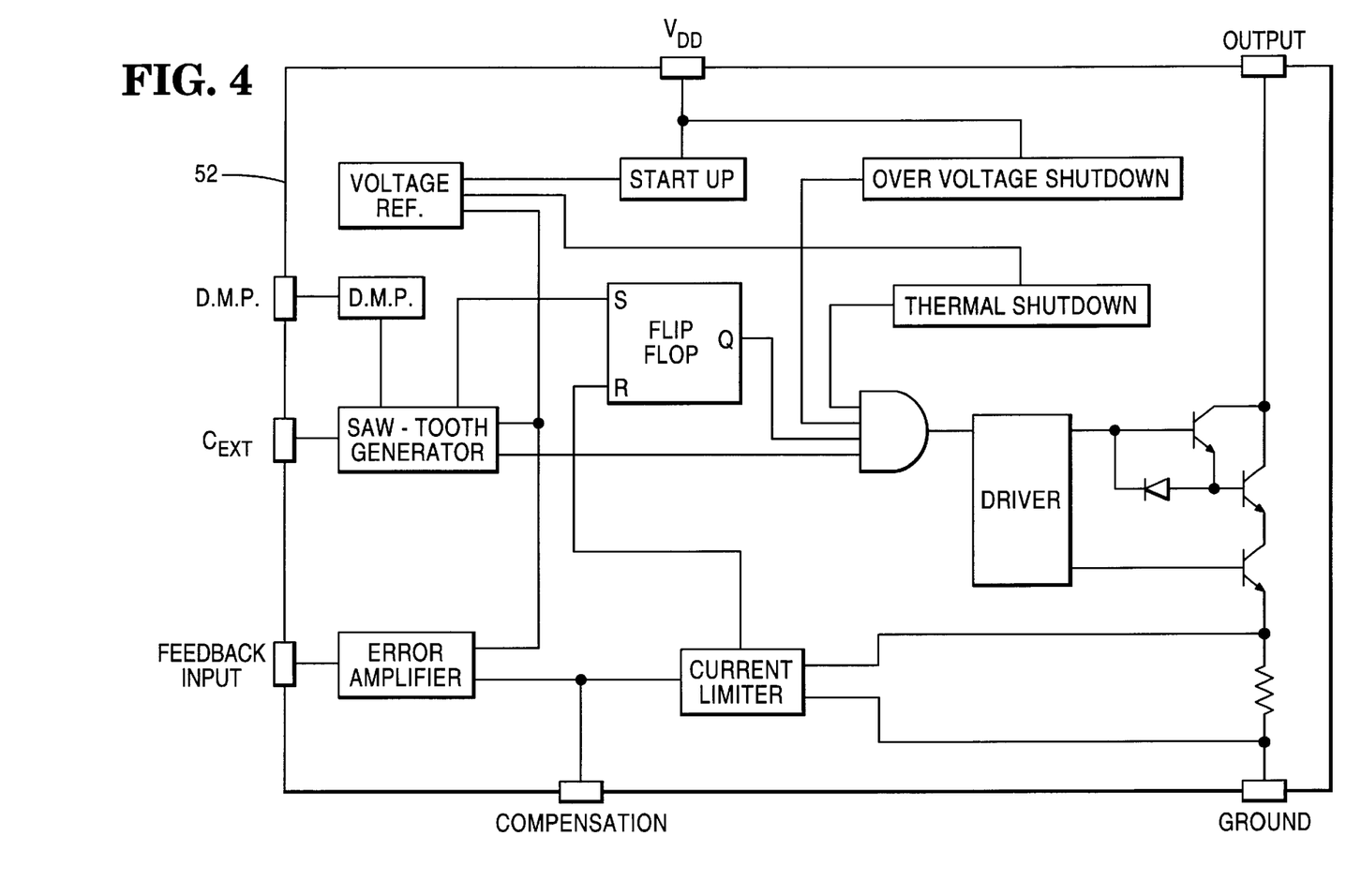
FIG. 4 is a block diagram of a partially integrated switch mode power supply integrated circuit device.
Figure 5:
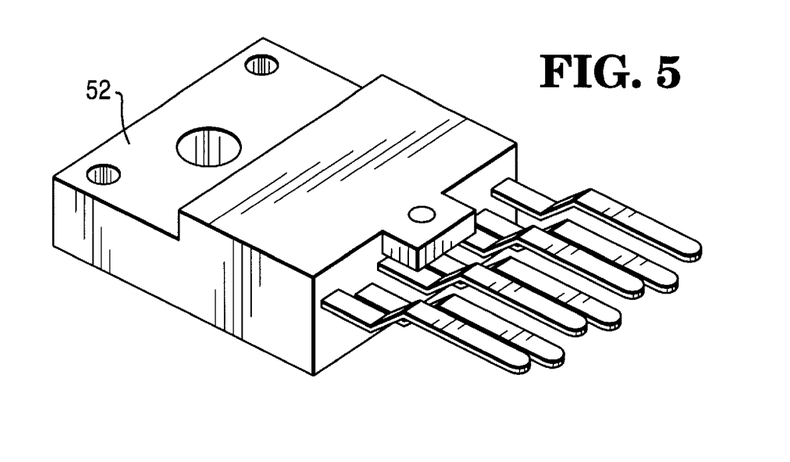
FIG. 5 shows the physical structure for the partially integrated SMPS integrated circuit device of FIG. 4.

FIG. 4 is a block diagram for the SMPS IC device 52 of FIG. 3. The operation of this SMPS IC device 52 is known in the art, and is further described in "Power Semiconductor Devices and Circuits", by Andre A. Jaecklin, 1992, available from Plenum Press, New York, and which is hereby incorporated by reference as background material. The physical shape of such SMPS IC is shown in FIG. 5.

Figure 6:
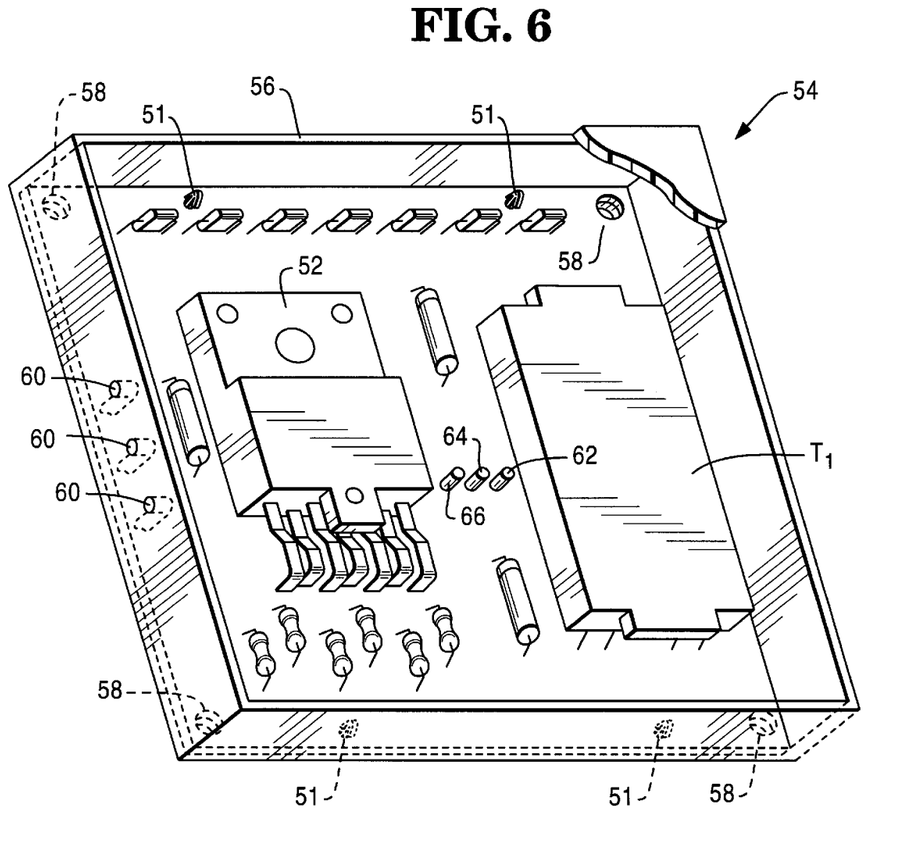
FIG. 6 shows the physical structure for a fully integrated switch mode power supply.

A key feature of the present invention is that the passive components of FIG. 3 are included within a single integrated circuit device package for high switching frequency (MHz) applications. As shown in FIG. 6, this integrated SMPS (iSMPS) device 54 allows for inclusion of such device in a wall outlet that provides DC, or a combination of AC and DC, supply voltages.

Referring now in detail to FIG. 6, the iSMPS 54 comprises the design depicted in FIG. 3. The devices shown in FIG. 3 are mounted on a printed circuit card which is contained within a rectangular case 56. The devices could alternatively be mounted on a multi-chip module substrate. There are four mounting holes 58 used to attach the case 56 to a switch housing (later shown in FIGS. 7 and 8). Three receptacles 60 accept standard AC house wiring, such as 12-2 or 14-2 AWG. These receptacles are similar in function to those found in standard AC outlets, where the AC wires (after having had the insulation removed from approximately ⅓–½ inch from the end) are press-inserted therein, and locked into place. A quick release (not shown) allows for removal of the AC wires for maintenance or other purposes. The three conductive posts 62, 64, and 66, centrally located on the printed circuit board and passing through the bottom surface of case 56, are used to electrically interconnect to the switch shown in FIG. 8.

The above embodiments and techniques allow for the design and implementation of DC-only or combined AC/DC wall outlets with the same size as an AC outlet. However, there are several issues we faced with the DC outlets which are different from the AC outlets. First of all, the AC outlets do not consume any power. But the iSMPS IC will dissipate power even when the output is not loaded. It is desirable to turn off the iSMPS when nothing is inserted in the outlets. The easiest way is to have an on/off switch on the outlets. A user then turns off the iSMPS when the outlets are not being used. But it is more desirable if the outlets can automatically turn themselves off when not used. The preferred way to eliminate power dissipation is to build an on/off switch into the connection port of the outlets themselves. When someone inserts a connector into the outlet, the plug will push the switch in and turn on the iSMPS. When the plug is removed, a spring in the outlet pushes the switch back to its original position and turns off the iSMPS. This type of switch is shown in FIG. 7, with the overall system interconnectivity to such switch shown in FIG. 8.

Figure 7:
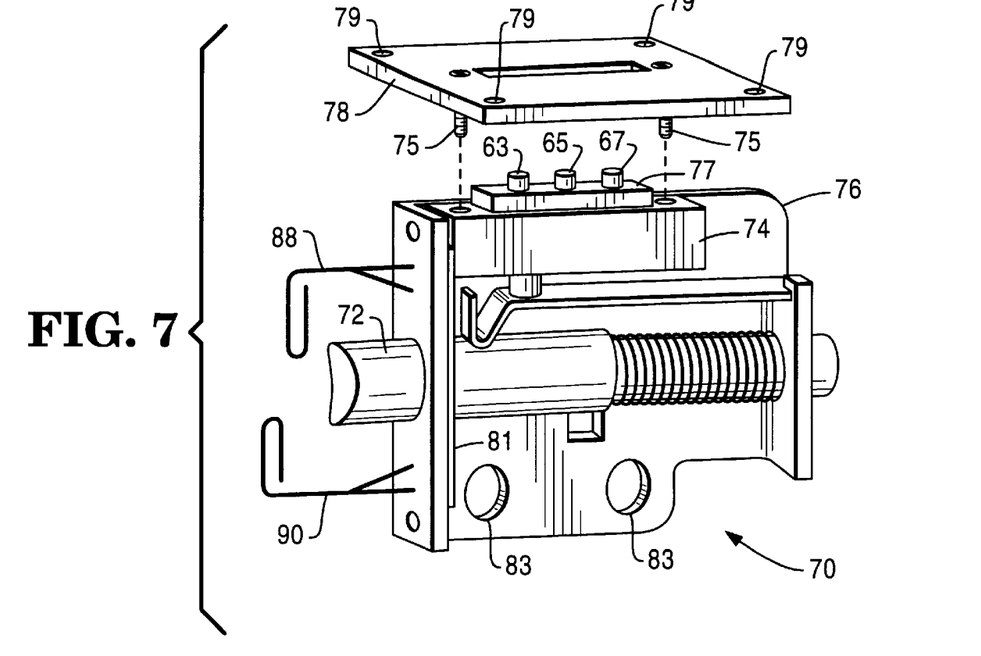
FIG. 7 shows a switch for turning off an integrated SMPS.

Referring now to FIG. 7, a microswitch 74 and spring-loaded actuator arm 72 are mounted to a switch housing 76 to form switch unit 70. When actuator arm 72 is depressed, the microswitch 74 closes, shorting the normally open switch output to ground. When the actuator arm is released, the microswitch opens to its normally open position. The normally open switch output is coupled to the iSMPS (54 of FIG. 6) via connectors 65 (DC ground) and 67 (switch output), which receives iSMPS pins 64 and 66. Plate 78 is press-fit or otherwise physically secured (via screws or posts 75) around the outer perimeter of block 77, and provides mounting support holes 79 for attaching an iSMPS device thereto.

Figure 8:
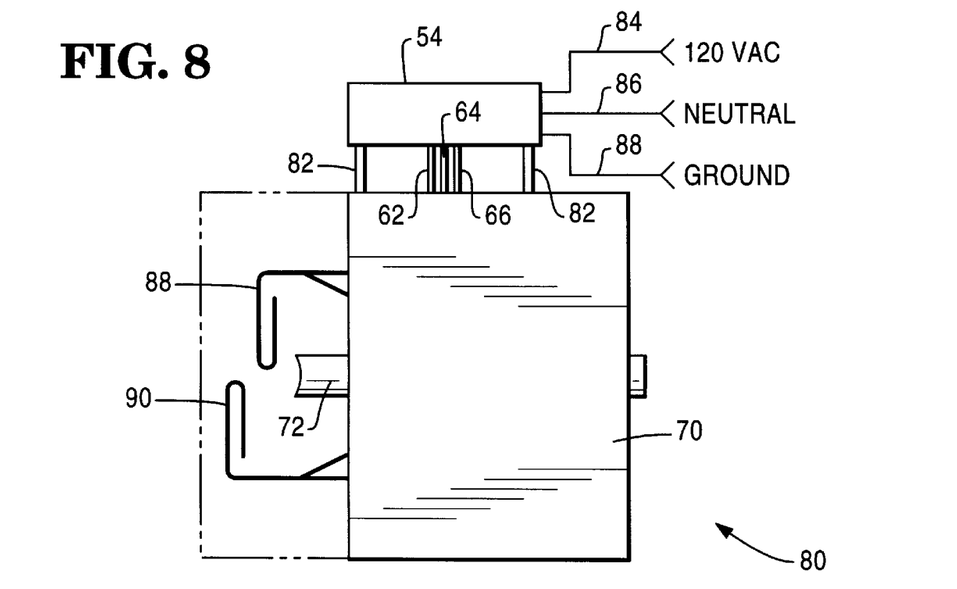
FIG. 8 shows an integrated switch mode power supply and switch for use as a wall outlet.

As shown in FIG. 8, the iSMPS device 54 is mounted to the upper surface of switch unit 70 (using mounting support holes 58 of FIG. 6 and 79 of FIG. 7). Hollow spacers 82 have screws passing therethrough. The screws provide mechanical attachment of package 56 to switch unit 70. The screws also provide an AC ground to switch unit 70 (from the AC ground wire 86 via device 54), in order to conform to various safety requirements. The other electrical connection between the iSMPS 56 and switch 70 is provided by pins 62, 64 and 66, which are the DC output, DC ground, and switch output voltages, respectively, and which plug into connectors 63, 65 and 67 of FIG. 7. Connector 63 is electrically coupled, via a copper strip (not shown) within switch extension 81 of FIG. 7, to conductor 88. Connector 65 is electrically coupled, via a copper strip (not shown) within switch extension 81 of FIG. 7, to conductor 90. Thus, wall outlet 80 provides DC voltages to conductors 88 and 90.

Figure 9:
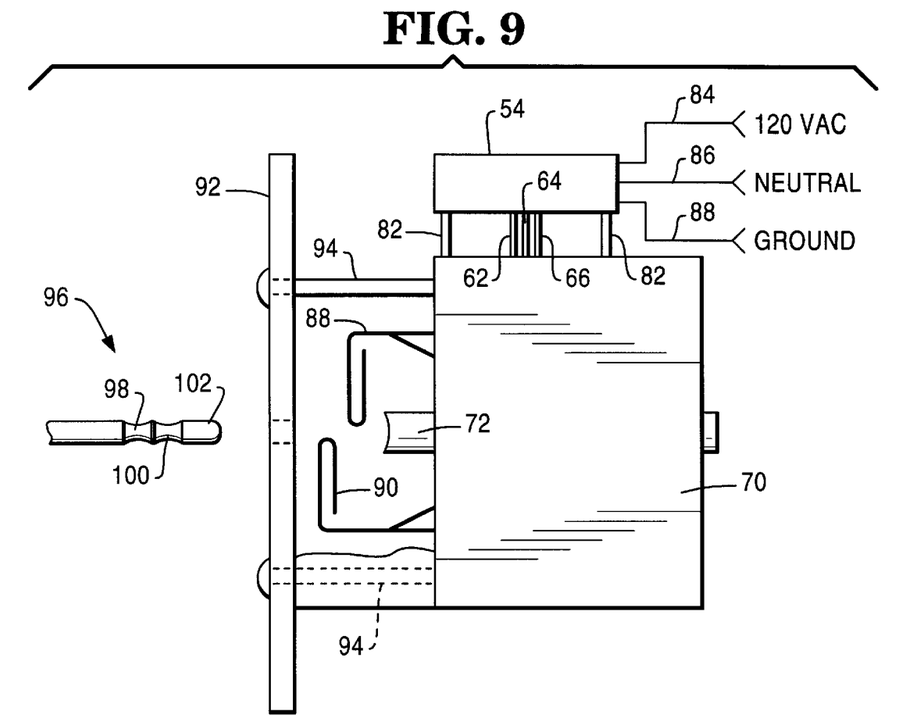
FIG. 9 shows a wall outlet with interconnecting electrical jack.

A face plate 92 is attached to switch 70 of wall outlet 80 by two screws 94, as shown in FIG. 9. The preferred order for initial construction of the assembly shown in FIG. 9 is to attach switch 70 to the stud of a wall via the switch housing mounting holes (83 of FIG. 7), similar to what is done today when mounting electrical boxes to studs. The iSMPS device 54 is then mounted on top of switch 70. Wires 84, 86 and 88, which provide AC input voltages, and then connected to the iSMPS 54. After drywalling, or other exterior surfacing for the wall has been completed, the face plate 92 is attached to switch 70. Alternatively, the entire wall outlet 80 can be pre-assembled into a single mounting box, and this box is then mechanically attached to a support structure (such as a stud), and electrically attached to an AC supply voltage.

Figure 10:
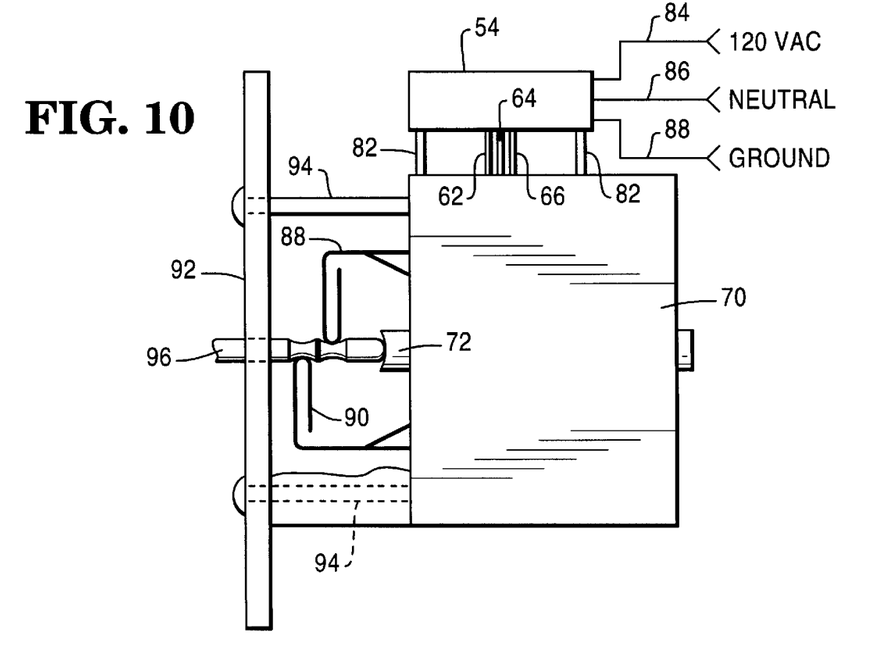
FIG. 10 shows a wall outlet with an engaged interconnecting electrical jack.

In operation, an electrical jack 96 is inserted into wall outlet 80 through face plate 92. Jack 96 has two indented regions 98 and 100. When the jack is fully engaged into the switch, conductors 88 and 90 lock into respective regions 100 and 98 of jack 96. This locking provides both a mechanical support, to hold the jack into the outlet, and electrical connectivity between conductors 88/90 and jack 96. Also upon insertion, the tip 102 of jack 96 will depress switch actuator 72. The switch output signal on conductor 66 will short to ground, indicating that DC supply voltages should be supplied via connecting posts 62 and 64 to conductors 88 and 90. A jack fully engaged in a wall outlet is shown in FIG. 10.

Figure 11:
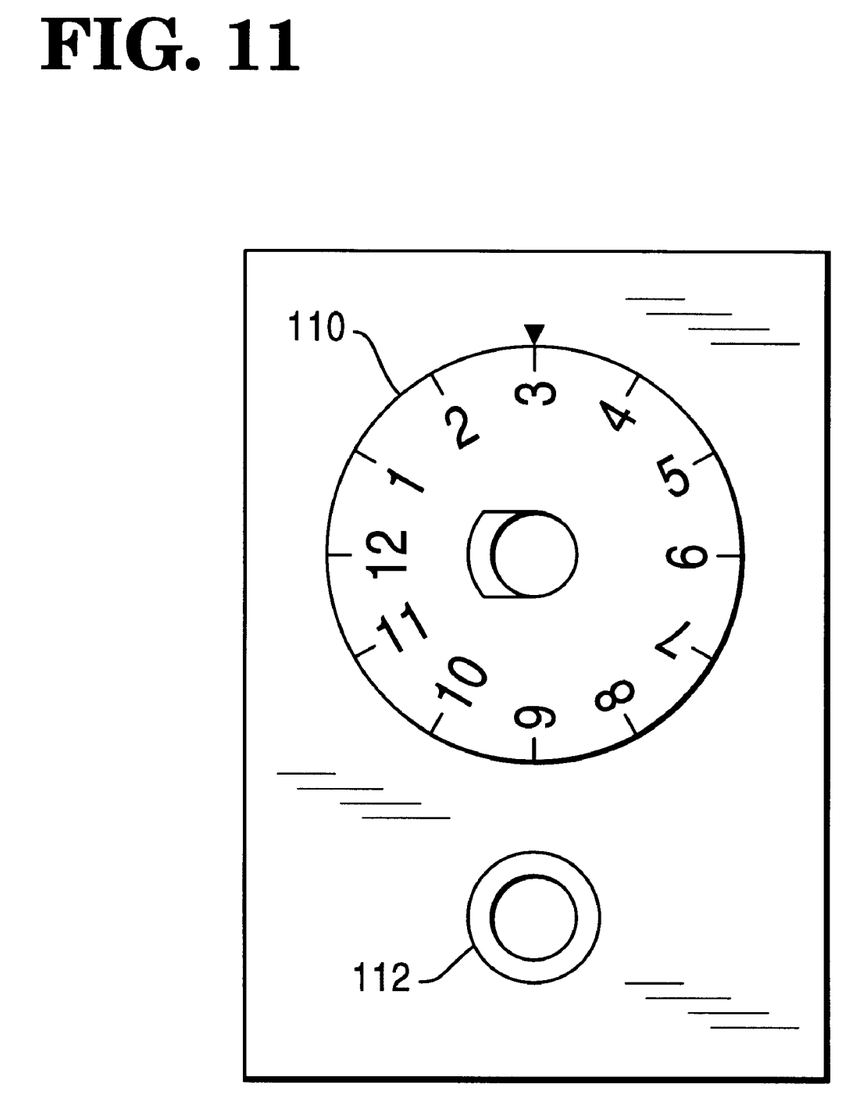
FIG. 11 shows a DC voltage selection technique using a knob.

Another problem we faced with a DC outlet is the DC output voltage level. Different devices may require different voltage levels, and using a wrong voltage level may damage the device(s) and create safety hazards. One way to do it is to include an adjustable output, as shown in FIG. 11. By turning the knob, a user can choose the voltage level within the output range. In the iSMPS, the output voltage is regulated by comparing the output voltage with a reference voltage. Therefore, by changing the reference voltage (through turning the knob 110), we can easily adjust the output voltage level that is provided at connector 112.

Figure 12A:
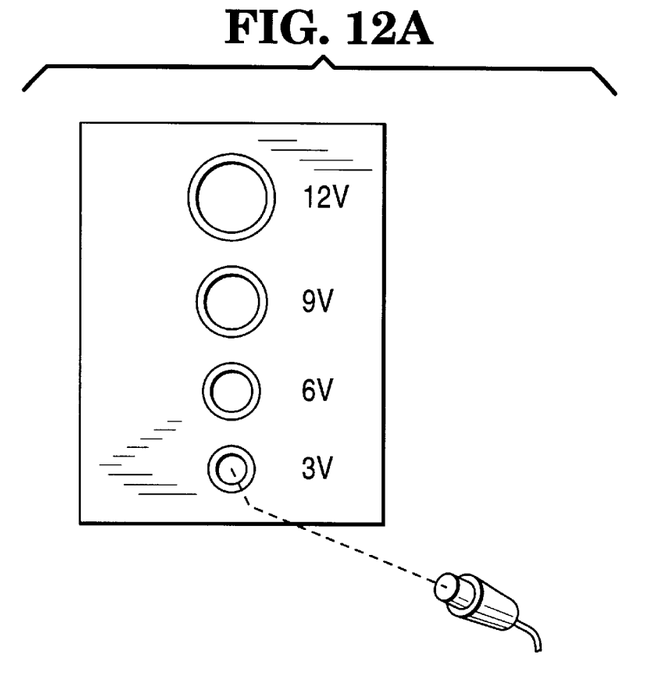
FIGS. 12A–12B show a DC voltage selection technique sing different sizes and shapes of connectors and plugs.
Figure 12B:
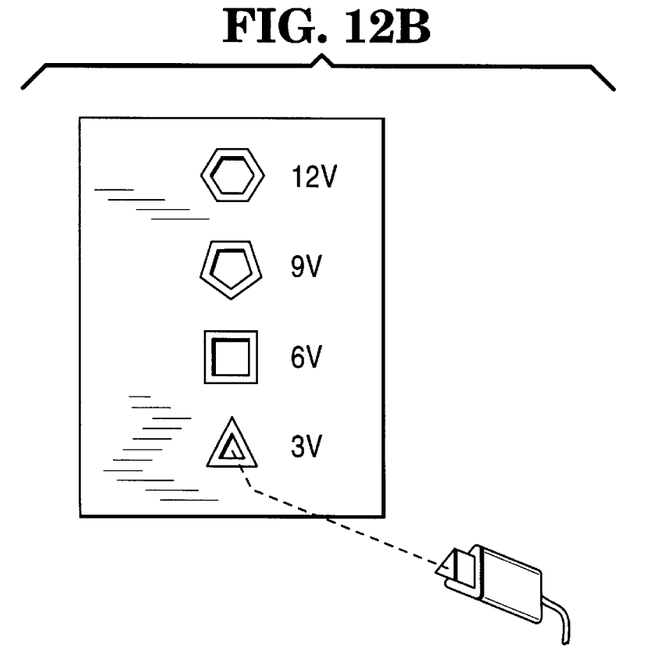
Figure 13:
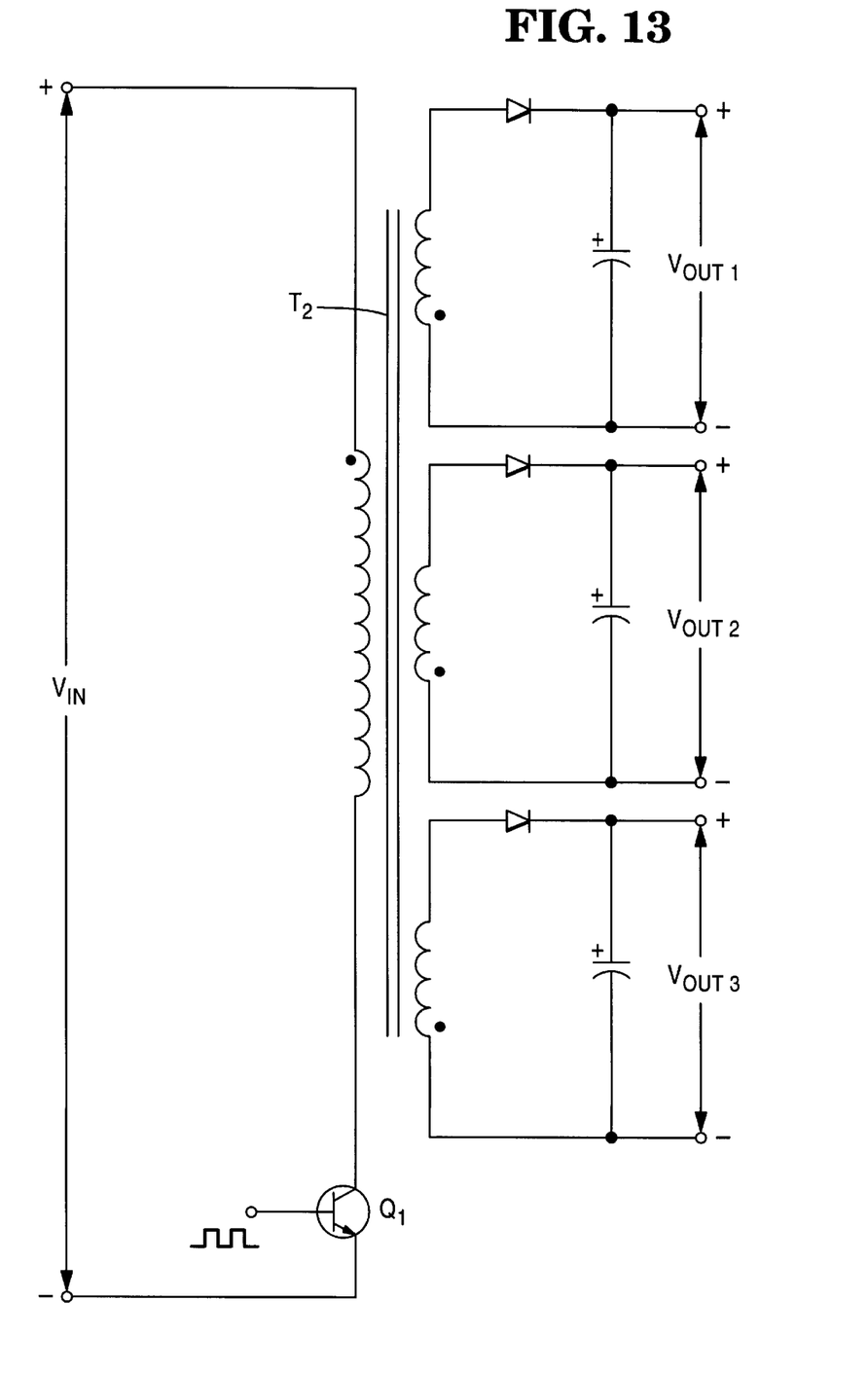
FIG. 13 shows the generation of a plurality of DC voltages from an integrated SMPS.

Although an adjustable outlet gives users the freedom of choosing the voltage level they want, in many cases a user may either forget to adjust the outlet or simply doesn't know the correct voltage level for the devices they want to use. Therefore, we provide DC outlets with a few fixed and commonly used standard voltage levels. To make sure that users will use the right voltage level, we have made the size or shape of the outlets a function of the voltage level, as shown in FIGS. 12A–12B. It should be noted that a single SMPS can generate several different output voltages at the same time by having several different secondary windings in the isolation transformer. FIG. 13 shows how this is implemented in the iSMPS. Switch 70 (FIGS. 7–10) is also modified to provide additional electrical interconnect, in a similar fashion to that as shown regarding pins 62/64/66, connectors 63/65/76, and conductors 88/90, to accommodate the additional voltages.

Figure 14:
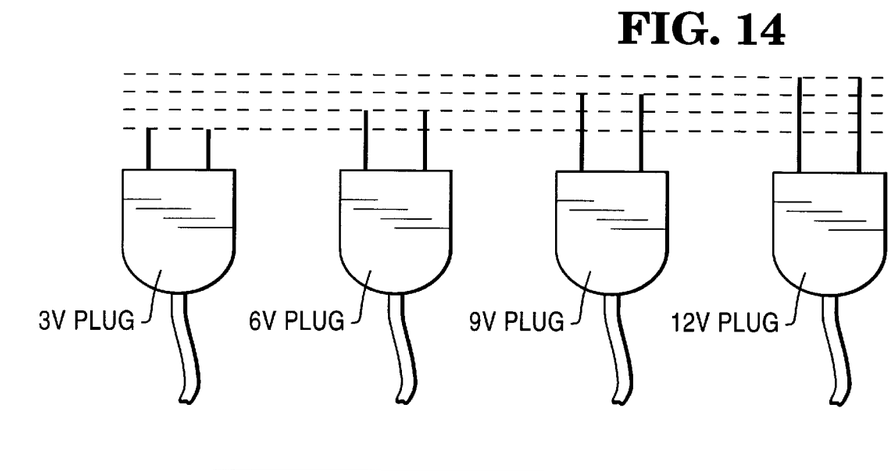
FIG. 14 shows a technique for automatically selecting a DC voltage from a common receptacle.

Alternatively, we apply the same concept of having a built-in switch in the port of the outlets. However, instead of having an on/off switch, there is an incremental multi-position switch or a linear switch which is basically a variable resistor whose resistance depends on how far it has been pushed in. We use plugs with different lengths for different voltage levels. As shown in FIG. 14, a 6V plug pushes the switch further into the outlets than the 3V plug. As a result, the resistance of the switch sets the output voltage to 6V. By doing so, the output voltage of the outlet can be set automatically by the device without manual adjustment. The wall outlet of FIG. 8 is modified by replacing the on-off micro-switch 72 with such a linear switch. The output resistance presented on the switch output pin 66 now represents the desired DC voltage. This output resistance is used in a voltage divider, using standard techniques known in the art, to divide down or reduce a maximum possible DC voltage to the desired value.

Figure 15:
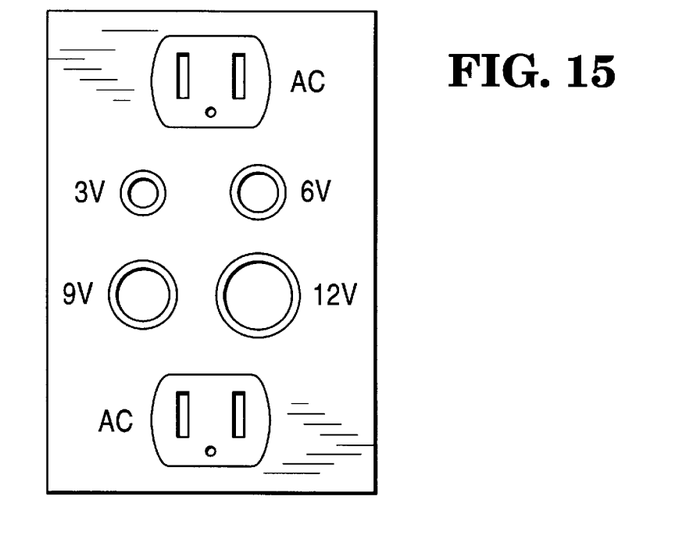
FIG. 15 shows a combined AC and DC wall outlet.
Figure 16:
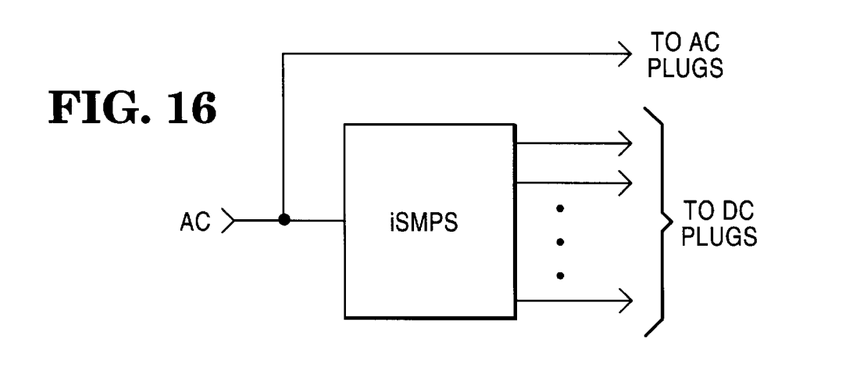
FIG. 16 shows the internal wiring for supplying the combined outlet of FIG. 15 with both AC and DC voltages.

Sometimes it will be advantageous to be able to get both AC and DC output voltages from the same wall outlet unit. To accommodate this, we have combined the AC outlets with the DC outlets. FIG. 15 shows two AC outlets with four DC outlets. Each DC outlet provides a different voltage level, using the voltage selection techniques previously described. Alternatively, we provide the previously described linear switch (FIG. 14) or adjustment knob (FIG. 11) in the DC outlets. For the adjustment knob(s), each of the four outlets can be adjusted independently but we need four iSMPS devices, or a device to disable other ports when one port is in use (as further described below). The iSMPS input AC voltage is provided directly to the AC plugs, as logically shown in FIG. 16.

Figure 17:
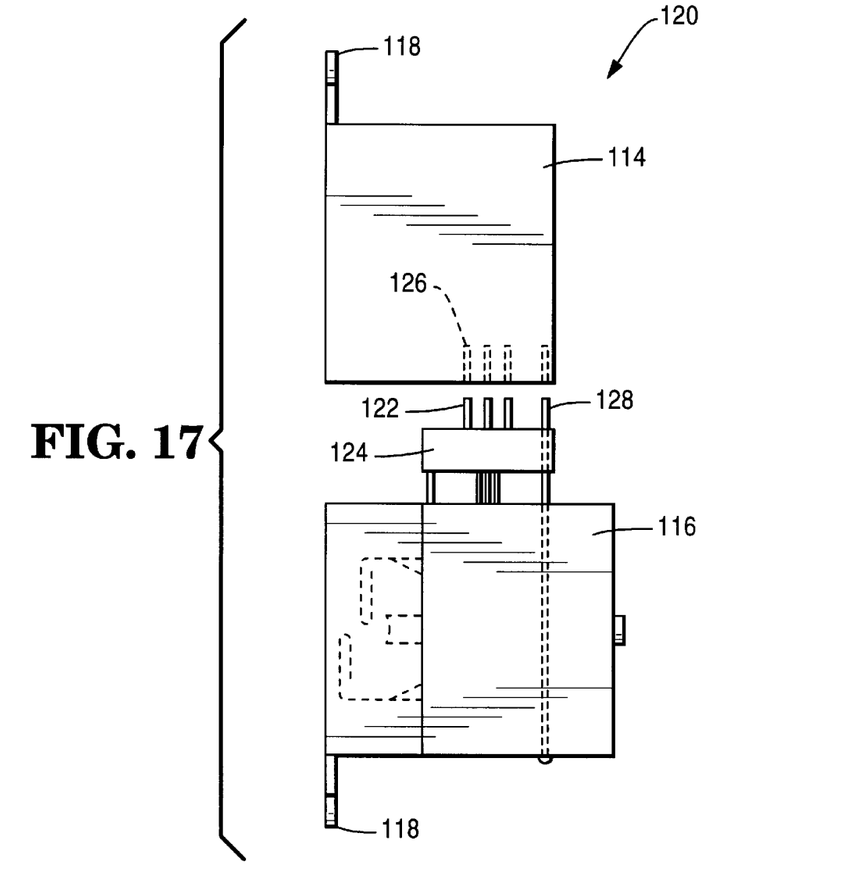
FIG. 17 shows a side view of a combined AC/DC outlet.
Figure 18:
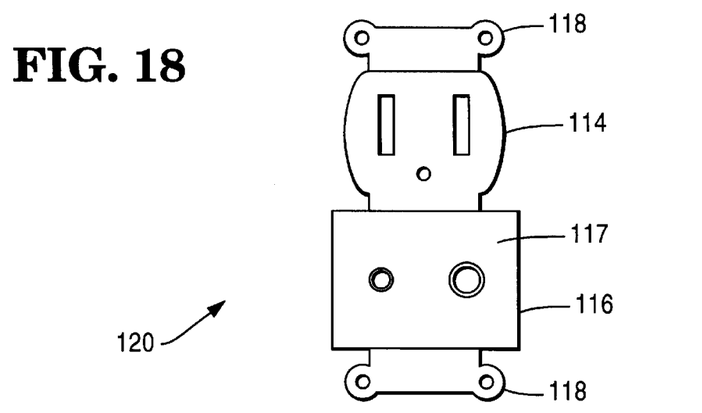
FIG. 18 shows a front view of a combined AC/DC outlet.

FIG. 17 shows the mechanical structure for such a combined AC/DC voltage supply source, and further exemplifies the flexibility of this modular approach. The upper portion of outlet 120 is a traditional AC outlet 114, having mounting structure 118. The lower portion 116 provides the DC voltages for the upper portion (i.e. the 3 volt and 6 volt) of the outlet shown in FIG. 15. FIG. 18 shows a front view of wall outlet 120. The lower portion 116 has a cover plate 117 similar to element 92 of FIGS. 9 and 10. A similar device to that shown in FIGS. 17 and 18 is used to provide the AC and DC voltages for the lower portion (i.e. the 9 volt and 12 volt) of the outlet shown in FIG. 15.

Continuing with FIG. 17, a DC wall outlet 116 has been modified from that shown at 80 in FIG. 8 to include AC connector pins 122 on the upper surface of the iSMPS device 124. These AC connector pins plug into receptacles 126 on the lower surface of AC outlet 114, in order to directly supply AC voltage to such AC outlet. Device 116 is mechanically attached to AC outlet 114 by one or more screws 128.

Figure 19:
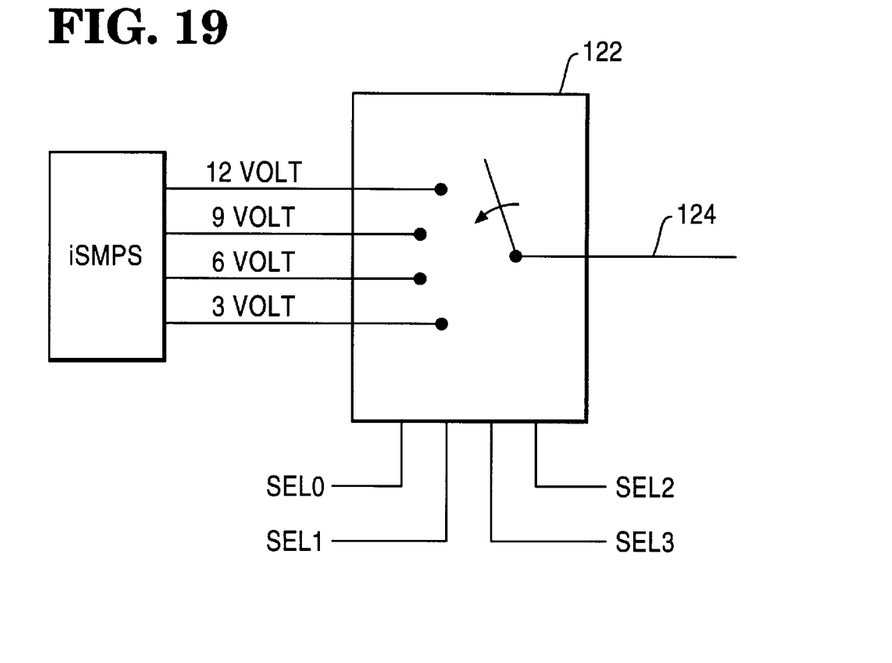
FIG. 19 shows a multiplexor/selector for coupling a specified DC voltage to a receptacle.

FIG. 19 shows how to disable all but one port when a single iSMPS device is used with a plurality of DC outlets. The iSMPS device provides four DC output voltages, using techniques as previously described with respect to FIG. 13. These DC voltages are coupled to a multiplexor or cross-bar 122. The multiplexor selectively couples one of the input voltages (3, 6, 9 and 12 volts) to its output terminal 124, based upon the select values SEL0–SEL3. These select values are either +5 volts or ground, depending on whether a jack is plugged into a respective input terminal. If more than one jack is plugged in (i.e. its select line tied to ground), the multiplexor provides the highest voltage requested. A truth table for the multiplexor 122 is shown below in Table 2.

TABLE 2

| SEL0 | SEL1 | SEL2 | SEL3 | 3 V | 6 V | 9 V | 12 V |
| --- | --- | --- | --- | --- | --- | --- | --- |
| 0 | 0 | 0 | 0 | NO | NO | NO | YES |
| 0 | 0 | 0 | 1 | NO | NO | YES | NO |
| 0 | 0 | 1 | 0 | NO | NO | NO | YES |
| 0 | 0 | 1 | 1 | NO | YES | NO | NO |
| 0 | 1 | 0 | 0 | NO | NO | NO | YES |
| 0 | 1 | 0 | 1 | NO | NO | YES | NO |
| 0 | 1 | 1 | 0 | NO | NO | NO | YES |
| 0 | 1 | 1 | 1 | YES | NO | NO | NO |
| 1 | 0 | 0 | 0 | NO | NO | NO | YES |
| 1 | 0 | 0 | 1 | NO | NO | YES | NO |
| 1 | 0 | 1 | 0 | NO | NO | NO | YES |
| 1 | 0 | 1 | 1 | NO | YES | NO | NO |
| 1 | 1 | 0 | 0 | NO | NO | NO | YES |
| 1 | 1 | 0 | 1 | NO | NO | YES | NO |
| 1 | 1 | 1 | 0 | NO | NO | NO | YES |
| 1 | 1 | 1 | 1 | NO | NO | NO | NO |

Select line 0 (SEL0) corresponds to the 3 volt plug, Select line 1 corresponds to the 6 volt plug, Select Line 2 (SEL2) corresponds to the 9 volt plug, and Select Line 3 (SEL3) corresponds to the 12 volt plug. A logical ZERO (0 volts) means a jack is plugged into the respective plug, whereas a logical ONE (+5 volts) means no jack is plugged into the respective plug. A 'yes' in the output column means the corresponding multiplexor/selector's input voltage is coupled to the output 124.

Figure 20:
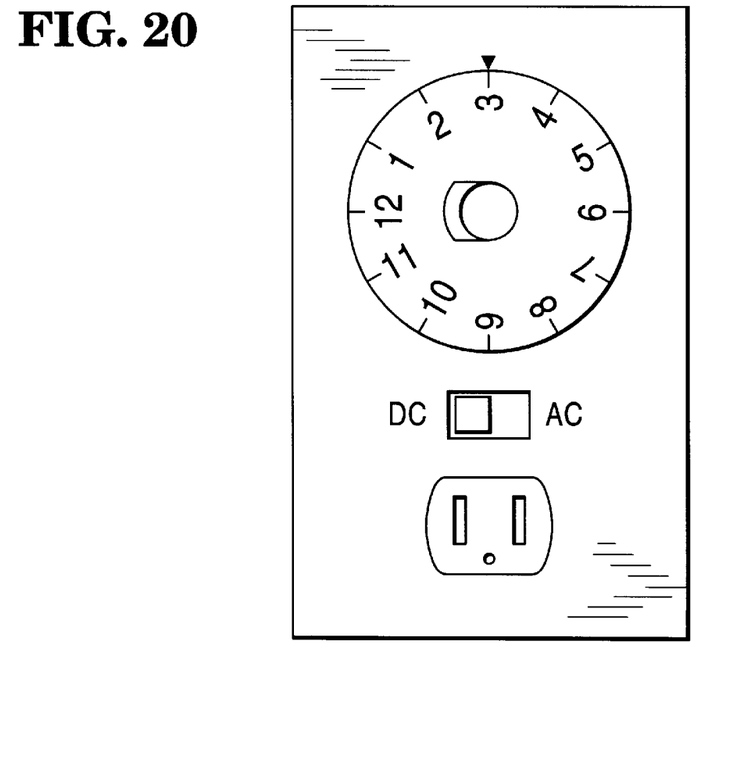
FIG. 20 shows a wall outlet with a common receptacle providing both AC and DC voltages.
Figure 21:
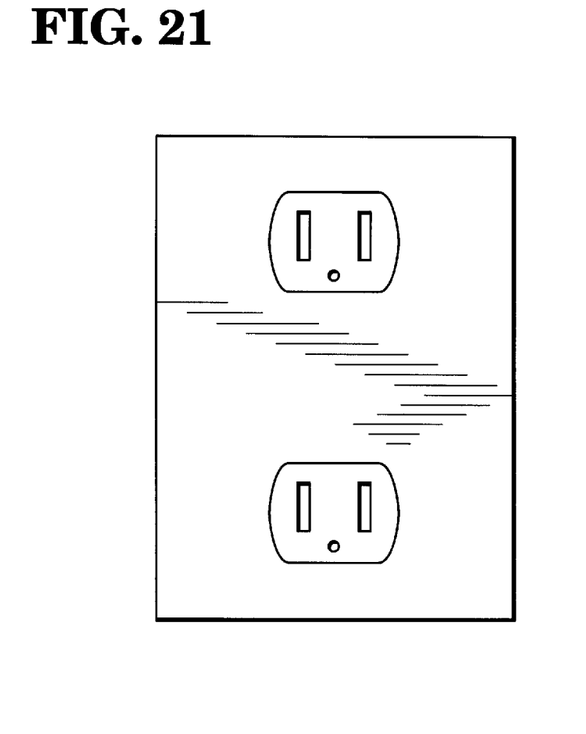
FIG. 21 shows an alternate wall outlet with a common receptacle for providing both AC and DC voltages.
Figure 22:
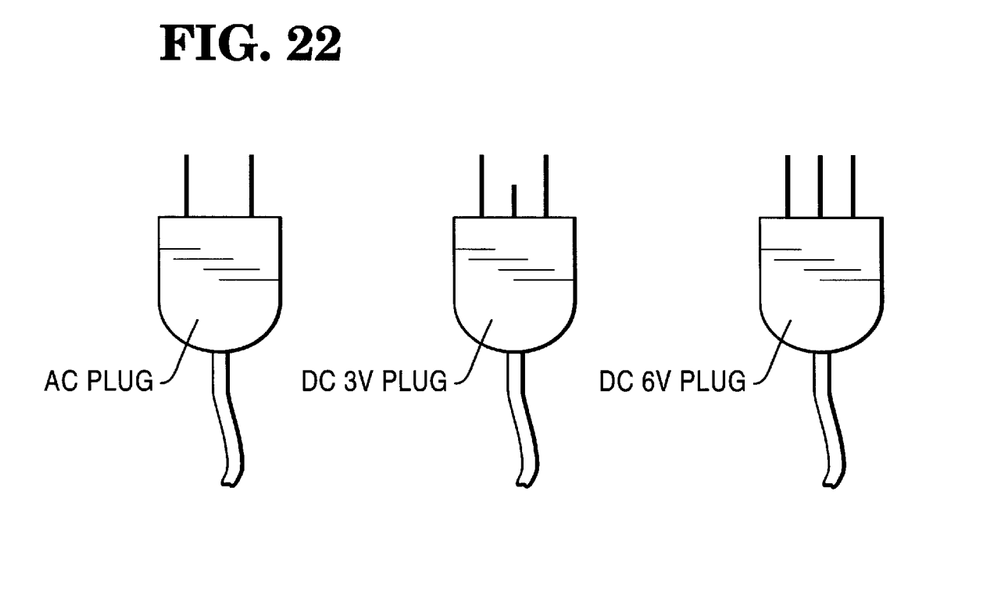
FIG. 22 shows a plurality of plugs having different pin configurations for selecting which type of voltage (AC or DC) is provided by the receptacle of FIG. 21.

It is also possible that users may want to use the same port for either AC or DC output. A simple solution is to have a switch which can choose between AC and DC output and a knob to adjust the voltage level if DC is chosen, as shown in FIG. 20. However, a safer and more elegant solution is to use a slightly different plug for DC applications. As shown in FIG. 21, each outlet has three slots instead of two. The default of the outlet is AC output. But when a DC plug with an extra leg is plugged into the outlet, as shown in FIG. 22, the extra leg will turn on the SMPS and switch the outlet to the DC mode. The length of the leg determines the DC output voltage level automatically, as previously described. If an AC plug having a third ground leg needs to be accommodated, then a fourth slot is added to the outlet of FIG. 21. This fourth slot would receive the extra DC leg just described.

While we have illustrated and described the preferred embodiments of our invention, it is to be understood that we do not limit ourselves to the precise constructions herein disclosed, and the right is reserved to all changes and modifications coming within the scope of the invention as defined in the appended claims.

What is claimed is:

1. In combination:
   an electrical wall outlet comprising at least one connector and an AC voltage to DC voltage converter coupled to said at least one connector; and
   means for selecting a particular DC voltage, from a plurality of DC voltages, for coupling to said at least one connector, wherein said means for selecting comprises at least one of a plurality of objects insertable into said at least one connector, said objects having different insertable lengths.

2. The combination of claim 1 wherein said means for selecting comprises a linear switch.

3. In combination:
   an electrical wall outlet comprising at least one connector and an AC voltage to DC voltage converter coupled to the connector; and
   means for selecting a particular DC voltage, from a plurality of DC voltages, for coupling to said at least one connector, wherein said means for selecting comprises an object insertable into said at least one connector, wherein said object, when inserted in said wall outlet, actuates a variable resistor.

4. In combination:
   an electrical wall outlet comprising at least one connector and an AC voltage to a DC voltage converter coupled to said at least one connector; and
   means for selectively enabling power to said converter.

5. The combination of claim 4 wherein said means for selectively enabling comprises a switch which is switched by insertion of an object into said at least one connector.

6. In combination:
   an electrical wall outlet comprising a connector and an AC voltage to a DC voltage converter coupled to the connector; and
   means for coupling either said AC voltage or said DC voltage to said connector, wherein said means for selectively coupling is selected by a DC plug comprising a DC pin, and wherein said DC pin has one of a plurality of different lengths depending on the DC voltage to be provided to said at least one connector.

7. The combination of claim 6 wherein the DC plug further comprises two AC pins.

8. A method for supplying at least one voltage to a wall outlet receptacle, comprising the steps of:
   converting an AC voltage to a DC voltage; and
   providing either said DC voltage or said AC voltage to said wall outlet receptacle as determined by a plug in the receptacle, wherein said converting step is disabled when the plug is not in the receptacle.

9. A method for supplying at least one voltage to a wall outlet receptacle, comprising the steps of:
   converting an AC voltage to a DC voltage; and
   providing either said DC voltage or said AC voltage to said wall outlet receptacle as determined by a plug in the receptacle, wherein DC voltage is provided to said wall outlet receptacle when the plug is in the receptacle, and AC voltage is provided to said wall outlet receptacle when the plug is not in the receptacle.

10. A method for supplying at least one DC voltage to a wall outlet, comprising the steps of:
    coupling at least a portion of a device requiring power to the wall outlet, and then enabling power to an AC to DC voltage converter to provide the at least one DC voltage to the wall outlet; and
    decoupling the at least a portion of a device from the wall outlet, and then disabling power to the AC to DC voltage converter.

11. A wall outlet, comprising an AC to DC voltage converter; and
    a switch for selectively activating power to the AC to DC voltage converter.

12. The wall outlet of claim 11, further comprising a receptacle for receiving a plug, wherein the switch is switched by the plug.

13. A method, comprising the step of selectively activating power to an AC to DC voltage converter located in a wall outlet when a plug is inserted in the wall outlet.

14. The method of claim 13, wherein length of the plug selects at least one of a plurality of DC voltages to be provided by the wall outlet.

15. A wall outlet, comprising:
    a DC portion having at least one DC output receptacle for providing a DC voltage;
    an AC portion having at least one AC output receptacle for providing an AC voltage;
    a modular AC voltage to a DC voltage converter disposed between the DC portion and the AC portion; and
    a switch for selectively powering the voltage converter.

16. The wall outlet of claim 15, wherein an AC supply voltage is connected to the voltage converter, and wherein the voltage converter couples the AC voltage to the AC portion and couples the DC voltage to the DC portion.

* * * * *